US008146356B2

(12) United States Patent
Leidinger et al.

(10) Patent No.: US 8,146,356 B2
(45) Date of Patent: Apr. 3, 2012

(54) PROCEDURE TO ALIGN WORKING EQUIPMENT MOUNTED TO A LIFTABLE AND LOWERABLE HOISTING FRAME OF A WORKING MACHINE

(75) Inventors: Gustav Leidinger, Friedberg (DE); Jörg Hermanns, Berlin (DE)

(73) Assignee: CNH Baumaschinen GmbH, Berlin (DE)

( * ) Notice: Subject to any disclaimer, the term of this patent is extended or adjusted under 35 U.S.C. 154(b) by 692 days.

(21) Appl. No.: 12/302,261

(22) PCT Filed: Apr. 27, 2007

(86) PCT No.: PCT/EP2007/003722

§ 371 (c)(1),
(2), (4) Date: Nov. 24, 2008

(87) PCT Pub. No.: WO2007/137662

PCT Pub. Date: Dec. 6, 2007

(65) Prior Publication Data

US 2009/0107133 A1 Apr. 30, 2009

(30) Foreign Application Priority Data

May 26, 2006 (DE) ........................ 10 2006 024 731

(51) Int. Cl.
*F16D 31/02* (2006.01)
*F15B 11/15* (2006.01)
*F15B 13/042* (2006.01)

(52) U.S. Cl. ............................. 60/429; 60/486; 91/437

(58) Field of Classification Search .................... 60/421, 60/428, 429, 484, 486; 91/436, 437, 440
See application file for complete search history.

(56) References Cited

U.S. PATENT DOCUMENTS

| | | | | |
|---|---|---|---|---|
| 3,811,587 A | | 5/1974 | Seaberg | |
| 5,007,544 A | * | 4/1991 | Saotome et al. | 91/437 |
| 5,356,260 A | | 10/1994 | Ikari et al. | |
| 5,784,812 A | * | 7/1998 | Leidinger et al. | 91/516 |
| 6,120,237 A | * | 9/2000 | Cummings et al. | 91/437 |

FOREIGN PATENT DOCUMENTS

| | | |
|---|---|---|
| DE | 4437300 | 12/1996 |
| DE | 19581883 | 12/1997 |

* cited by examiner

*Primary Examiner* — Michael Leslie
(74) *Attorney, Agent, or Firm* — Patrick M. Sheldrake

(57) ABSTRACT

The procedure, provides a simple and retro-fittable manner to align working equipment, mounted to a liftable and lowerable hoisting frame of a working machine in a tilting way to comply with required positions, wherein the working equipment is shifted via a tilting cylinder in other directions than the hoisting framing. The tilting cylinder is supplied with hydraulic oil from a hydraulic pump for the working hydraulic system by a direct-operated control valve, and secondary consumers of the working machine being supplied with hydraulic oil from at least one other hydraulic pump. Once the driver operates a triggering element, the two hydraulic connections of the tilting cylinder are also connected to the hydraulic pump for the secondary consumers by a switch-over valve activated by the control equipment, therefore shifting the tilting cylinder in the direction of the neutral position of the working equipment.

11 Claims, 2 Drawing Sheets

PROCEDURE TO ALIGN WORKING EQUIPMENT MOUNTED TO A LIFTABLE AND LOWERABLE HOISTING FRAME OF A WORKING MACHINE

This application is the US National Stage filing of International Application Serial No. PCT/EP2007/003722 filed on Apr. 27, 2007 which claims priority to German Application DE 10 2006 024 731.0 filed May 26, 2006.

Mobile working machines, including wheeled loaders/tractor shovels, will have working equipments which are mounted on the frame of the working machine by means of a liftable and lowerable hoisting framing. For prompt working sequences, it is reasonable (especially when working with a tractor shovel) to return the hoisting framing, once it has been emptied in the lifted position of the hoisting framing and lowered down again, automatically to a position with ground contact which allows the driver to continue his work, i.e. picking up new material with the shovel base, without having to modify the position, the shovel base being set at a favourable angular position, approximately in parallel to the ground for example. Depending on the circumstances, it may be an advantage to be able to preset the shovel base in the direction of a certain positive or negative adjusting angle. In general, tractor shovels from a certain size, an operating weight of 7 tons for instance, today are provided with a hydraulic pre-control system for the control valve which provides for the operation of the hoisting and shovel tilting systems and in some cases additional functionalities. Such tractor shovels equipped with a pre-control system for the control valve are known to be equipped with automatic return control systems which shift the shovel back to a neutral position once it was activated (i.e. into the position in which it contacts the earth at a desired angle.) It is therefore necessary to intervene into the pre-control system for the hydraulic circuit triggering the shovel tilting function in order to activate the return system in the intended way. An intervention into the pre-control system will also have the benefit of only having to control a small oil volume at low pressures.

Such low oil deliveries also offer the advantage of low switching times of the solenoid valves which are therefore provided with low nominal diameters. The valve piston, however, will need a certain floating time in order to be shifted, by spring force, to its central position after reaching the corresponding angular shovel position. As the hydraulic pump will apply force for the working hydraulic system to the tilting cylinder(s) during this switch-off period, and as its rate of delivery depends on the drive motor speed prevailing during this period, the result will be a different overrun period of the tilting cylinder once the switch-off signal is activated so that the shovel does not contact the ground at a parallel position (or at a preset desired angle of adjustment). Either the disadvantageous shovel position affecting the next material loading sequence can be tolerated, or a shovel position largely independent from the motor speed by initiating other measures can be reached, as it is described in DE 44 37 300 C2, for instance.

The automatic return systems described above are therefore not only suitable for working machinery provided with hydraulic pre-control systems for the control valve. But tractor shovels of lower weight categories up to approximately 6 tons will frequently be direct-controlled, i.e. the driver-operated control lever directly acts on the control valve piston using a reversing gear. These working machines have no hydraulic pre-control system for the control valve which would allow for an implementation of the automatic return systems we know today. Kinematic systems for the hoisting and tilting mechanisms of working machines, especially tractor shovels of this type, are therefore mainly designed in such a way that the shovel is fully tilted out in its topmost hoisting framing position, and will contact the ground in an approximately parallel position when the hoisting mechanism lowers it down. This however only applies when lowering starts from the topmost position of the hoisting framing. If the shovel, in fully tilted position, is lowered from another, lower hoisting height, there will be strong deviation from parallelism.

A serious disadvantage will arise from the use of a stacker fork when the kinematic system is designed in this way. The fact that the tilting angle which places the shovel in a favourable position for material pickup from its ground position becomes larger, at least in the first part of the hoisting course, will result in the angular position of the fork taking the same course so that the driver will have to continuously readjust during lifting to keep the fork arms at an approximately parallel position to the ground. Dangerous circumstances will arise however when stacked material (a loaded pallet) is unloaded and lowered from a medium hoisting height, for instance, as it is the case when lorries or railway wagons are unloaded, and the fork arms are in a position parallel to the ground. If the driver is not careful to counter-control the movement, the arms will increasingly lower down to the front risking the loaded material to glide off the arms.

Tractor shovels of this weight category are increasingly used for stacking tasks so that kinematic systems are currently designed so that the stacker fork is guided in parallel during the entire hoisting course. If you now lower the hoisting framing when the shovel is fully tilted, the shovel will contact the ground at a strongly inclined angle, with its shovel blade or its teeth first. This shows the need for an automatic return system for working machinery with direct-operated control valve, too.

When using direct-operated control valves, the tilting piston of the titling mechanism can not be used to return the shovel as it would have to move independently of the control lever the driver is holding in his hand. This would only be possible with an expensive separation of the control gear from the control valve, fitting an actuating cylinder or any such device in between. The space needed alone would largely eliminate such an option, as the reversing gear is often directly mounted on the control valve housing. The oil volume required for an automatic return system would have to be received directly between the working hydraulic pump and the control valve, resulting in the requirement of a large nominal diameter of the valve, on the one hand, and the impossibility of the driver controlling the lifting function during automatic tilting back, on the other hand. In this case, once the tilting-back sequence has automatically stopped, the pump delivery would suddenly act on the lowering side of the hoisting cylinders so that the driver would no longer see at what moment the lowering behaviour would change. Such an approach is therefore impossible.

It would be desirable to provide an automatic return system for the tiltable working equipment of a working machine with a direct-operated control valve for the tilting cylinders, which is as simple as possible and which can be fitted at later times, for instance.

The driver operates a triggering element, two hydraulic connections of the tilting cylinder are also getting connected to the hydraulic-pump for the secondary consumers, therefore shifting the tilting cylinder in the direction of the neutral position of the working equipment, by means of a switch-over valve activated by the control equipment.

The delivery of the pump can be used for the secondary consumers for the automatic return system, and not for the use of the delivery of the pump for the working hydraulic system. The feed can either be received ahead of the hydromotor for the oil cooler fan, the fan running in the usually available free-wheel drive mechanism during the short period of back-tilting and only being subjected to low speed reduction, or it can be received after the fan, the force needed for shovel back-tilting being applied to the fan motor at its output orifice, the fan motor being enabled to absorb that force however.

The oil is fed to the tilting cylinder by an electromagnetic switch-over valve which is inserted in the supply line from the hydraulic pump for the secondary consumer. This switch-over valve has a switching diagram which, once the automatic return system is activated via the trigger element (switch), guides the oil delivery to the two tilting cylinder connections so that pressure is applied to the tilting cylinder according to the principle of a differential cylinder, which means that the piston rod extension speed depends on the volume released by it and which the pump delivery has to top up.

With the usual piston rod/cylinder area ratio of approx. 1:4, corresponding to a cylinder diameter which is about half the piston rod diameter, the piston rod will, in the case of a specified rate of delivery, be extended four times as fast as in the case of the cylinder only being pressurized on the piston side. As the rate of delivery of the hydraulic pump used for this purpose is only about half the rate of delivery of the hydraulic pump for the working hydraulic system, the piston rod is therefore extended with about double the speed compared to the use of the pump for the working hydraulic system. This results in that, in case of hoisting framing positions lower than maximum height levels, the working equipment (shovel) contacts the ground in an end position parallel to the ground, even after the automatic return system was triggered. This is a great benefit especially for tractor shovels of said weight categories (up to approx. 6 tons) and speedy workflows, when material will frequently only be poured onto a great heap and the hoisting framing needs not be hoisted until its topmost position.

An arrangement provides for the detection of the tilting cylinder position and its monitoring by the switch-over valve control unit, as well as for the switching of the switch-over valve control unit into a position in which the two tilting cylinder hydraulic connections will be shut off from the hydraulic pump for the secondary consumers once the pre-set neutral position of the tilting cylinder is reached. This ensures the exact alignment of the working equipment in the pre-set neutral position.

The preferred switch-over valve will be a 4/2-way directional control valve.

By preference, this working machine has a tilting cylinder which is equipped with a tilting cylinder position detection device which is connected to the control unit. The tilting cylinder is preferably designed or connected respectively as a differential cylinder.

In an arrangement, a nonreturn valve is provided in the hydraulic line between the switch-over valve and the tilting cylinder hydraulic connection on the piston rod side. This nonreturn valve ensures trouble-free function even though, with activated automatic return system, the driver may be operating, at the same time, the control valve in the direction of tilting.

The solution described above facilitates automatic shovel return systems of a simple structure with working machines, including tractor shovels with direct-operated control valves, which however still have advantages compared to conventional systems with control valves with hydraulic pre-control systems:

High adjusting speeds can be achieved due to the differential switchgear of the tilting cylinder so that low waiting times will occur once the automatic return system is triggered and the tractor shovel can drive back because the shovel is quickly tilted, when lorries are loaded, for instance, the front shovel area in tractor shovels of the said size categories engaging below the upper lorry dropgate edge. During shovel emptying, with a hoisting framing not lifted up to end position, such a high adjustment speed also enables the shovel to contact the ground in a parallel position when it is lowered.

The differential switchgear of the tilting cylinder along with its roughly fourfold speed increase is the reason why the pump for secondary consumers, having a lower delivery rate than that of the pump for the working hydraulic system, can be used in order to achieve an increase of adjusting speeds which will still be superior to all systems available today and meet all operational requirements. This will also enable you to keep all components of the system structure small due to the lower rate of delivery.

The desired end position of the working equipment (shovel) is controlled with high repeating accuracy, even with varying motor speeds resulting in different rates of delivery of the pump, as the switch-off process is triggered by a solenoid valve of a low nominal diameter. Said solenoid valves have switch-off times of less than 50 ms. In conventional systems, however, in which the control valve tilting mechanism piston is, via the pre-control system, responsible for deactivation of the return sequence, the shovel end position is strongly affected by the motor speed prevailing each time, as the actuating time of a solenoid valve, which you can find here as well, is increased by that of the tilting piston, which results in a multiplication of that of the solenoid valve. To compensate for this, additional devices will be necessary in all of the well-known systems.

The driver will not have to cope with any critical or unforeseeable operating situations, in cases where the automatic return system is triggered accidently, or if overloads occur. This also applies to the activation of the control valve tilting mechansim in any possible adjustment direction during the automatic return process. Additional fitting is easily made during final assembly of the machine, and retrofitting is easily possible after its delivery; all existing structural parts of the working machine remain unmodified. You only have to connect hydraulic lines of a low nominal diameter in addition to the simple electrical/electronic elements for signal transmission which can be easily mounted.

BRIEF DESCRIPTION OF THE DRAWINGS

The drawing shows in

DETAILED DESCRIPTION OF THE INVENTION

Figure 1:
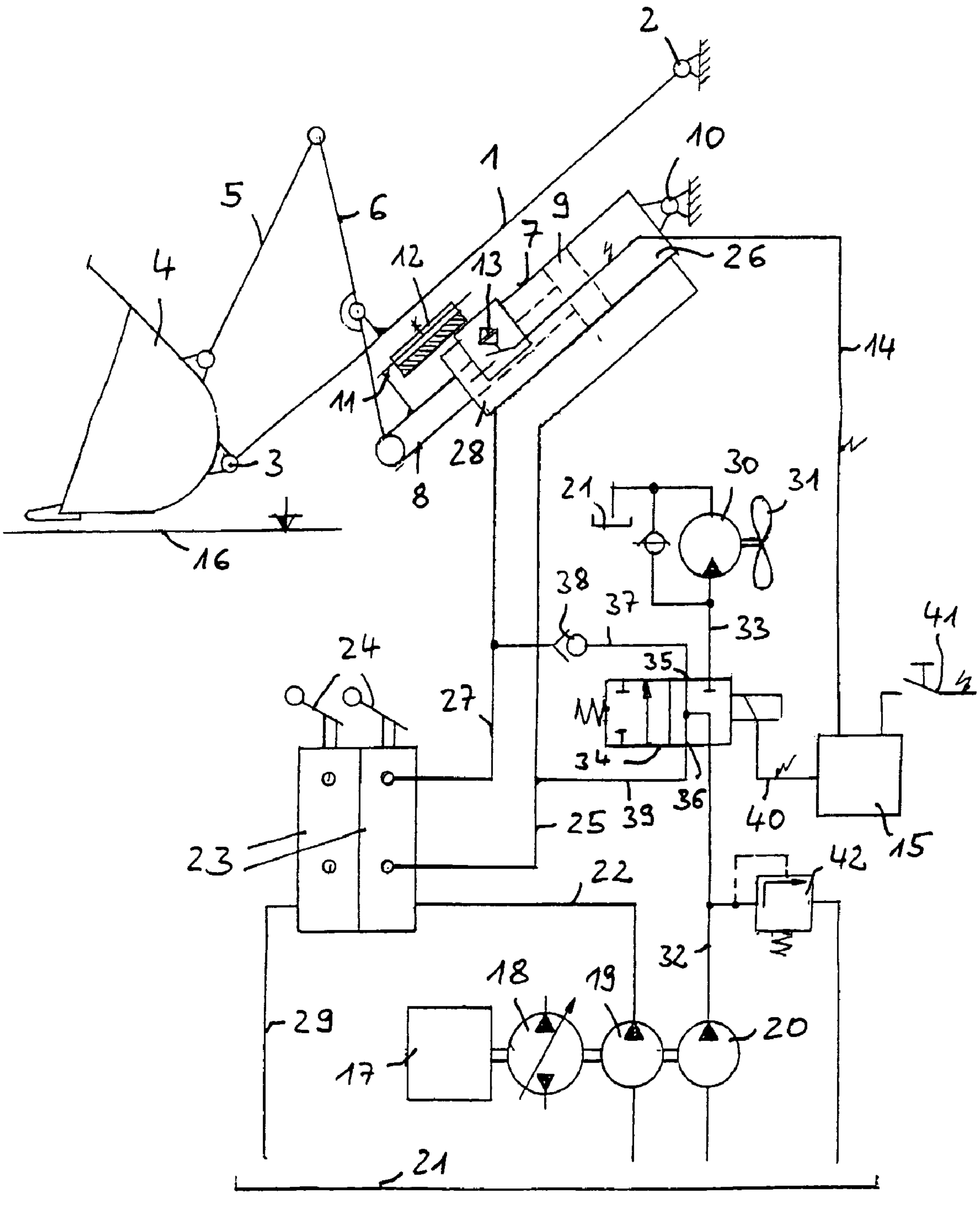
FIG. 1 shows a hydraulic circuit diagram for a tractor shovel not displayed in detail.

A hoisting framing 1 of a tractor shovel, which is not is displayed in further details, is represented in a schematic form. This hoisting framing 1 can be lifted and lowered at a link point and is mounted to a tractor shovel frame whose details are not given here. At the lower end of hoisting framing 1, there is some working equipment connected at a link point 3, the working equipment forming a shovel 4 in this example of an arrangement. Said shovel 4 can be tilted, in relation to hoisting framing 1, around link point 3 by means of an articulated lever mechanism 5, 6 using a tilting cylinder generally designated as 7.

Tilting cylinder 7 has a piston rod 8 and a piston 9 and is mounted to the tractor shovel frame in an equally articulated way, through a link point 10 at the end opposed to piston rod 8.

A carrying rod 11 is fixed to the end section of piston rod 8, which is located outside the tilting cylinder, and this carrying rod 11 has at its free end a control flag 12, which is part of a tilting cylinder position detection device. The tilting cylinder 7 proper is equipped with the second element of the tilting cylinder position detection device, which is in our example a component part designed as limit switch 13, which is actively connected via an electrical signal line 14 with an electronic control unit 15 whose function is explained in the following. It is of course possible to design the tilting cylinder position detection device in another way. The only important thing is that it can detect the position of tilting cylinder 8 which corresponds to the specified neutral position of shovel 4 in relation to the ground 16 (shown in FIG. 1).

The working machine, in the present example, the tractor shovel, has a drive engine, e.g. a Diesel engine 17, driving three hydraulic units, namely a preferably adjustable hydrostatic travel drive 18, a hydraulic pump 19 for the working hydraulic system of the tractor shovel, and at least another hydraulic pump 20 for secondary consumers. Hydraulic fluid is supplied from, or returned respectively to, a tank generally designated with 21, by way of hydraulic units 18, 19, 20.

Among other things, hydraulic pump 19, of the working hydraulic system, is responsible for the driver's regular operation of shovel 4 via tilting cylinder 7. Pump 19 is therefore, via a hydraulic line 22, connected to a control valve 23 which the driver can directly operate using control levers 24. Control valve 23 is connected to the piston side 26 via a hydraulic line 25, and to the annulus collector 28 of the tilting cylinder 7 with a hydraulic line 27.

Hydraulic pump 20 for secondary consumers is, for example, used to supply or drive a fan motor 30 driving a fan 31. Hydraulic pump 20 is connected for this purpose to fan motor 30 via two hydraulic lines 32 and 33, an electromagnetic 4/2 directional valve 34 being arranged between the two hydraulic lines 32 and 33. In the home position of valve 34 shown in FIG. 2, fan motor 30 is connected to hydraulic pump 20. A pressure-relief valve 42 safeguards hydraulic pump 20.

Solenoid valve 34 moreover has two connections 35, 36, a hydraulic line 37 being connected to annulus collector 28 of tilting cylinder 7, the hydraulic line 37 being in turn connected to connection 35, and a non-return valve 38 being inserted in hydraulic line 37. A hydraulic line 39, which in turn has a connection to the piston side 26 of tilting cylinder 7, is connected to connection 36.

The electromagnetic 4/2 directional valve 34 is connected to the control unit 15 via an electrical signal line 40, and this signal line is in turn connected to a trigger element 41 designed as a switch.

Figure 3:
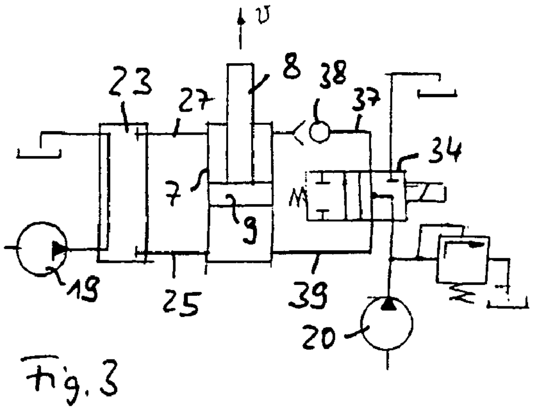

If the driver wishes to trigger the automatic return system, he operated the switch or trigger element 41, and this results in the control equipment 15 adjusting the 4/2 directional valve 34 into the switching position shown in FIGS. 1 and 3 in which both the oil delivery of hydraulic pump 20 and the oil volume displaced out of the annulus collector 28 of tilting cylinder 7 which is now being added through connection 35, will join to be supplied to the piston side 26 of tilting cylinder 7 via connection 36, in order to apply pressure to tilting cylinder 7 according to the principle of a differentiating cylinder, i.e. the extension speed of piston rod 8 is defined by the oil volume released and to be topped up by the delivery of hydraulic pump 20. In this position of solenoid valve 34, the fan motor 30 is decoupled from hydraulic pump 20.

Piston rod 8 of tilting cylinder 7 is being extended via hydraulic pump 20, thereby conducting shovel 4 in neutral position, until the tilting cylinder position detection device 12, 13 has detected that the specified, desired maximum extension position of piston rod 8 and therefore the desired neutral position of shovel 4 is reached. A corresponding signal is transmitted via signal line 14 to control unit 15, and this signal switches 4/2 directional control valve 34 into the home position shown in FIG. 2 excluding any further oil supply from hydraulic pump 20 to tilting cylinder 7. FIGS. 2 through 6 show the individual operating status of the automatic return system.

Figure 2:
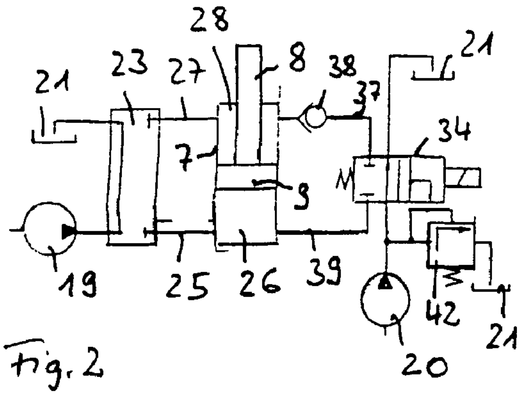
FIGS. 2 through 6 show the individual operating status of the hydraulic circuit diagram section affected as per FIG. 1.

In FIG. 2 the automatic return system is not activated. Solenoid valve 34 switches on the oil supply from hydraulic pump 20 which can now freely flow to the secondary consumer(s) (fan motor 30, for instance). The connections 35, 36 of tilting cylinder 7 are locked by action of solenoid valve 34 so that the driver's operation of control lever 23 (via control lever 24) which activates tilting cylinder 7 will not result in any mutual affection.

The position shown in FIG. 3 is the condition after the driver activated the automatic return system with trigger element 41. The delivery of hydraulic pump 20 joins with the oil displaced from the annulus collector 28 of tilting cylinder 7 to flow in the direction of the piston side 26 of tilting cylinder 7. Both cylinder sides have the same pressure due to the connection made between them by solenoid valve 34. The force applied to the outside by piston rod 8 equals the product of hydraulic pressure and piston rod area. The tilting mechanism of control valve 23 is not activated in this case, and the oil from hydraulic pump 19 for the working hydraulic system can continue to flow to tank 21 largely without being pressed. When the shovel reaches the parallel position which corresponds to the ground, which is detected by the tilting cylinder position detection device 12, 13, the solenoid valve 34 switches off again, and the circuit diagram shown in FIG. 2 is given.

Figure 4:
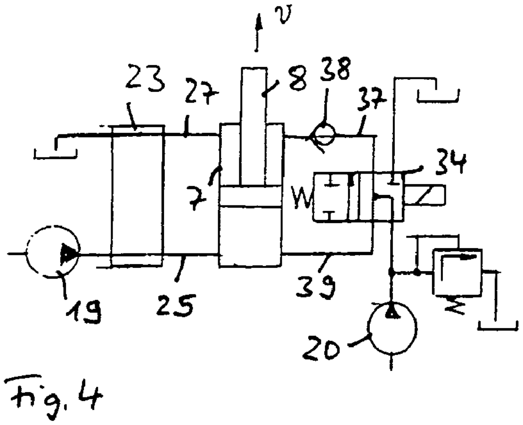

In the representation of FIG. 4, the tilting cylinder 7 is additionally pressurized by the driver into the direction of "tilting" during the automatic return tilting process. Piston rod 8 continues to extend, but the differential effect of tilting cylinder 7 is nullified because the annulus collector 28 of tilting cylinder 7 is connected with tank 21 by means of control valve 23. The non-return valve 38 inside hydraulic line 37 will prevent the deliveries from the two hydraulic pumps 19 and 20 flowing to annulus collector 28 of tilting cylinder 7; they can only flow, as desired, to the piston side 26. The oil volume displaced from annulus collector 28 will be directly fed to tank 21. After reaching the cylinder position corresponding to the ground parallelism, the solenoid valve 34 switches off, and there is again the diagram shown in FIG. 2, with the difference that shovel 4 continues to move in this direction if the driver keeps the tilting mechanism connected to "tilting" via the control lever.

Figure 5:
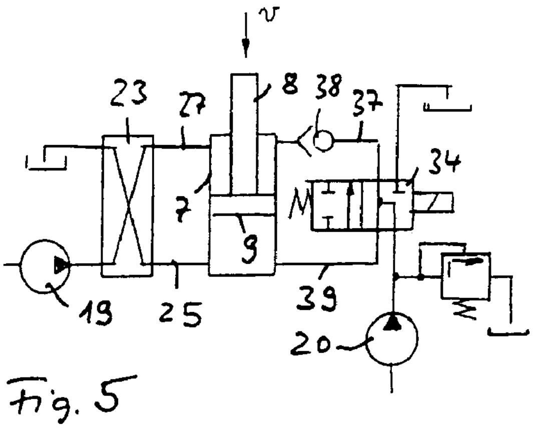

In the situation displayed in FIG. 5, the tilting cylinder 7 is additionally pressurized by the driver in the direction of "Emptying" during automatic return tilting. Although such a procedure has no practical importance for the application of the tractor shovel, it may be noted here nevertheless that this then results in an emptying operation the driver apparently desired. Both oil deliveries are directed from the piston side 26 of tilting cylinder 7 into tank 21 by the opening of the return flow channel in control valve 23, while the hydraulic pump 19 for the working hydraulic system is supplying oil to the annulus collector 28 which in turn is connected with the piston side 26 of tilting cylinder 7 both via the nonreturn valve 38 and solenoid valve 34. Due to the dead weight of the working unit, the speed of the withdrawing piston rod 38 will be defined by the flow resistances inside the lines, the control valve 23 and the solenoid valve 34. The shovel in any case will move into the direction of emptying controlled by the driver.

Figure 6:
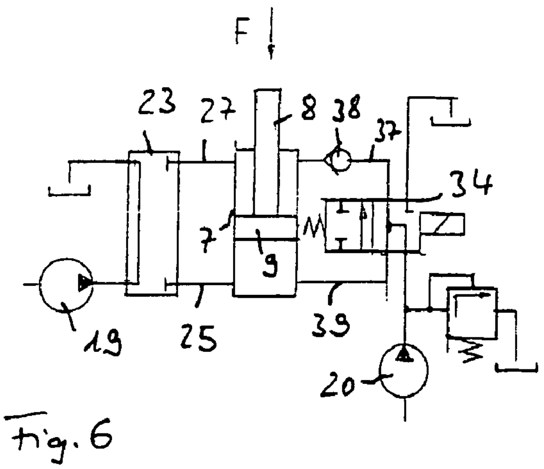

In the situation displayed in FIG. 6, a higher load F is applied to shovel 4 in the "Emptying" direction, exceeding the retention force due to the differentiation connection of tilting cylinder 7 after activation of the automatic return system. This may be the case if shovel 4 was only partially emptied because larger material quantities remain stuck or if, during work using a tree clamp or pipe clamp, the driver has accidentally operated switch 41 for the automatic return system while shovel 4 is still inclined to the front, still clamping the load. Tilting cylinder 7 will have the tendency to withdraw, but nonreturn valve 38 will prevent the pressure built up on the piston side 26 of tilting cylinder 7 from propagating into annulus collector 28. A hydraulic force retaining tilting cylinder 7 may be generated, which equals the quantity of the product from piston area and the pressure of the pressure-relief valve 42, so that the outside load can be retained in position. In this case, the hydraulic pump 20 for the secondary consumers will supply towards the tank via pressure-relief valve 42. If the driver now operated the "tilting" function by means of control valve 23, the annulus collector 28 of tilting cylinder 7 is released into the return channel in control valve 23, and piston rod 8 will extend in the desired direction.

We claim:

1. A procedure to align working equipment, which is tiltabley mounted to a liftable and lowerable hoisting framing of a working machine in a tilting way to comply with required positions, comprising the steps of:

shifting the working equipment via a tilting cylinder in other directions than the hoisting framing, the tilting cylinder being supplied with a hydraulic oil from a hydraulic pump for the working hydraulic system by a direct-operated control valve, and secondary consumers of the working machine being supplied with hydraulic oil from at least one other hydraulic pump, operating a triggering element configured to establish a flow path between two hydraulic connections of the tilting cylinder and direct flow from the hydraulic pump for the secondary consumers to the flow path, therefore shifting the tilting cylinder in the direction of a preset neutral position of the working equipment, by a switch-over valve activated by the control equipment.

2. A procedure according to claim 1, further comprising:

detecting and monitoring the tilting cylinder position using the switch-over valve control unit, wherein once the neutral position is reached the control unit will control the switch-over valve into a position in which the two tilting cylinder hydraulic connections will be shut off from the hydraulic pump for the secondary consumers.

3. A procedure according to claim 1, wherein the switch-over valve will be a 4/2-way directional control valve.

4. A working machine comprising:

a liftable and lowerable hoisting framing and a working equipment mounted in a tilting way with regards to the hoisting framing, a tilting cylinder connected, through a direct-operated control valve, to a hydraulic pump for the working hydraulic system and a secondary hydraulic pump for a secondary-consumer, the tilting cylinder connected to the working equipment to control the position of the working equipment with respect to the framing;

a switch over valve configured in a first position to divert flow from the secondary hydraulic pump for the secondary consumers to a flow path between two hydraulic connections of the tilting cylinder; and to place the switch over valve in a trigger element configured to place the switch over valve in a first position in response to an operator triggering command until the working equipment has reached a preset neutral position.

5. A working machine according to claim 4, wherein the tilting cylinder is provided with a device configured to detect the tilting cylinder position and which is connected to the control unit.

6. A working machine according to claim 4, wherein the tilting cylinder is designed as a differential cylinder.

7. A working machine according to claim 4 wherein a non-return valve is provided in the flow path between the connections between the switch-over valve and the hydraulic connection on a piston rod side of the tilting cylinder.

8. A working machine according to claim 4, wherein the control unit is configured upon actuation of the element to control the switch over valve to diver flow from the second pump to join with flow displaced from a first side of the cylinder to a second side of the cylinder.

9. A working machine according to claim 4, wherein the tilting cylinder is pressurized in the direction of tilting when the triggering element is actuated a second side of the cylinder is connected to a tank by the control valve and flow from the first and second hydraulic pumps are directed to the first side of the tilting cylinder.

10. A working machine according to claim 4, wherein the switch over valve in the first position establishes the flow path between the first and second connection and disconnects the flow path in a second position.

11. A working machine comprising:

a liftable and lowerable hoisting framing and a working equipment mounted in a tilting way with regards to the hoisting framing, tilting cylinder connected, through a direct-operated control valve, to a hydraulic pump for the working hydraulic system and at least one other hydraulic pump for a secondary consumer being provided, wherein the hydraulic pump for the secondary consumers is connected, via a switch-over valve to a flow path between the two hydraulic connections of tilting cylinder valve operated via a trigger element from a control unit; and wherein the switch-over valve is a 4/2-way directional control valve.

* * * * *